F. H. WEAVER.
DEVICE FOR HANDLING SEWER PIPE SECTIONS.
APPLICATION FILED OCT. 6, 1914. RENEWED SEPT. 13, 1916.

1,222,166. Patented Apr. 10, 1917.

Witnesses:
J. L. Sanbacher
Maude M. Amoss.

Inventor:
Frederick H. Weaver
By Chafin & Ferguson
Attorney

UNITED STATES PATENT OFFICE.

FREDERICK H. WEAVER, OF BALTIMORE, MARYLAND.

DEVICE FOR HANDLING SEWER-PIPE SECTIONS.

1,222,166.  Specification of Letters Patent.  Patented Apr. 10, 1917.

Application filed October 6, 1914, Serial No. 865,252. Renewed September 13, 1916. Serial No. 119,980.

*To all whom it may concern:*

Be it known that I, FREDERICK H. WEAVER, a citizen of the United States, residing at Baltimore, in the State of Maryland, have invented certain new and useful Improvements in Devices for Handling Sewer-Pipe Sections, of which the following is a specification.

This invention relates to improvements in devices for handling sewer pipe sections, and has for its object to provide a simple and efficient device for handling concrete pipe sections of various sizes and weights.

The invention consists of the novel construction and arrangement of the parts and combination of parts hereinafter more fully set forth in the following specification and pointed out in detail in the appended claim.

In the accompanying drawings,—

Figure 1:
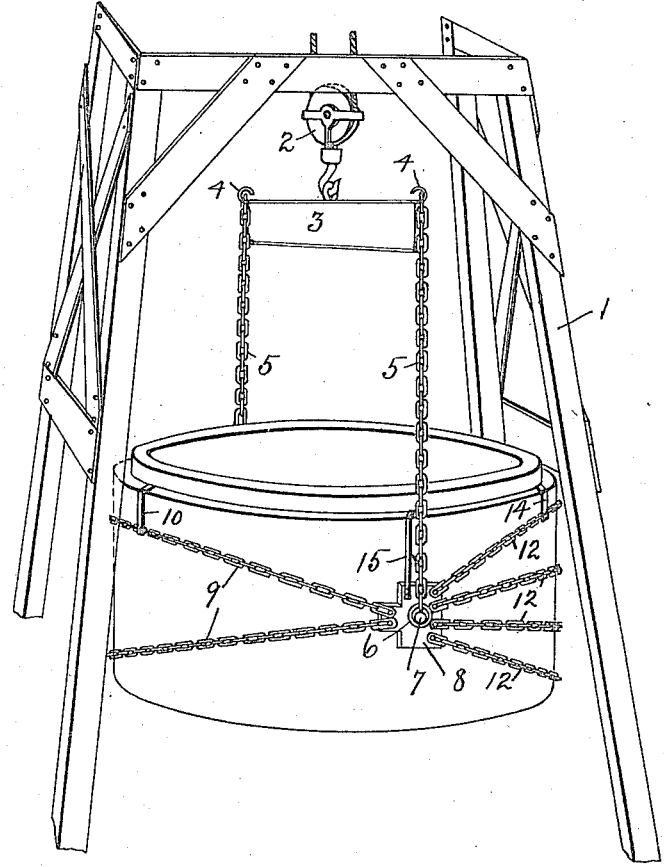
Figure 1 is a perspective view of my invention.
Figure 2:
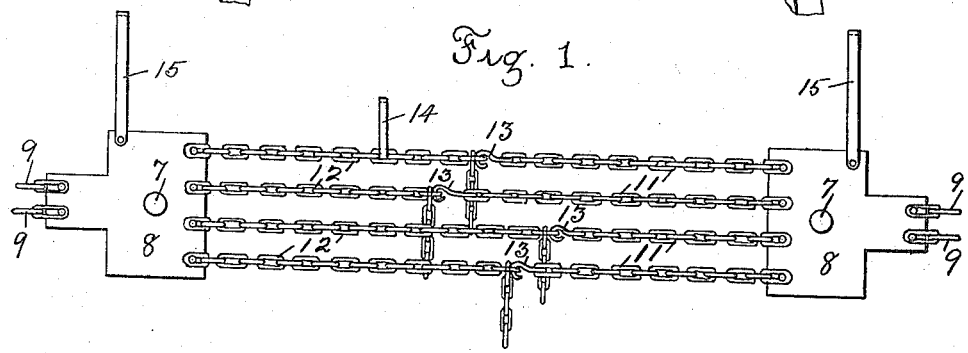
Fig. 2 is a plan view of the adjustable chains.

Referring to the accompanying drawing, forming part of this specification, and in which like reference numerals designate like parts throughout the several views thereof, 1 designates the frame work of a lift provided with the usual pulley block (not shown) from which is hung a pulley 2 having an I-beam 3 suspended therefrom. Said I-beam 3 has hooks 4 on opposite ends thereof from which are suspended the chains 5, the lower ends of which latter are provided with rings 6 which fit over the trunnions 7 projecting from the plates 8. The chains 9 have their ends secured to the plates 8 and the upper chain has a hook 10 which takes over the upper edge of the pipe section to hold said chain up in position, the lower chain will fall into position of its own weight. One of the plates 8 is provided with a number of chains 11 and the other plate 8 is provided with a number of chains 12, the chains 11 each being provided with a hook 13 in its free end adapted to fit into the links of the chain 12 to adjust the device for the various sizes of pipe sections.

The upper one of the chains 12 is also provided with a hook 14 which takes over the upper end of the pipe section to hold said chain in position on the pipe. The plates 8 are each also provided with a pivoted hook 15 which takes over the upper end of the pipe section to hold said plates in position on the pipe section.

The operation of the device is as follows:

The chains 11 and 12 are adjusted to suit the size pipe to be handled and they and the chains 9 are placed over the said pipe section with the hooks 10, 14 and 15 resting on the top of said pipe. The rings 6 of the chains 5 are then placed over the trunnions 7 and the pipe raised by means of the pulley block. When the pipe is raised to the desired height it can be readily tilted on the trunnions 7, then lowered on its side, after which the chains are removed therefrom and the pipe rolled away.

Having thus described my invention, what I claim is:

In a device for handling sewer pipe sections, the combination of two plates 8 each having a trunnion 7 projecting from one side thereof, a hook 15 pivoted to each plate and adapted to take over the edge of the pipe section, two chains 9 connecting said plates, a hook 10 secured to the upper one of said chains and adapted to take over the edge of the pipe section, a number of chains 11 each having one end connected to one of said plates and their free ends provided with hooks, a number of chains 12 each having one end connected to the other plate, a hook 14 on the chains 12 adapted to take over the edge of the pipe section to hold it in position thereon, a beam 3, and two chains 5 suspended from said beam and each having a ring 6 on its lower end adapted to take over the trunnions on said plates.

In testimony whereof I affix my signature in presence of two witnesses.

FREDERICK H. WEAVER.

Witnesses:
 CHAPIN A. FERGUSON,
 MAUDE M. AMOSS.

Copies of this patent may be obtained for five cents each, by addressing the " Commissioner of Patents, Washington, D. C."